United States Patent Office 3,535,375
Patented Oct. 20, 1970

3,535,375
PREPARATION OF AMINO CARBOXYLIC ACID SALTS
Philip F. Jackisch, Royal Oak, Mich., assignor to Ethyl Corporation, New York, N.Y., a corporation of Virginia
No Drawing. Filed Nov. 20, 1967, Ser. No. 684,506
Int. Cl. C07c 51/26
U.S. Cl. 260—531    6 Claims

ABSTRACT OF THE DISCLOSURE

Tertiary amino carboxylic acid salts are prepared from tertiary amino alkanols and alkali metal hydroxides as illustrated by the following equation.

$$N(CH_2CH_2OH)_3 + 3NaOH \rightarrow N(CH_2COONa)_3 + 6H2$$

The reaction is preferably conducted in the presence of water and a cadmium catalyst such as cadmium oxide. This invention demonstrates that better results are achieved by promoting the reaction with an aryl carbinol used in conjunction with the water and catalyst. Triphenylmethanol is a typical promoter alcohol. Best results are obtained by use of an excess of metal hydroxide together with the water-carbinol-catalyst system.

BACKGROUND OF THE INVENTION

The conversion of alcohols to the corresponding alkali metal salts of carboxylic acids—by heating the alcohols with alkali metal hydroxides—has been known for over 125 years. In this regard, reference is made to Dumas and Stas, 35 Ann. 129–73 (1840).

The reaction has been extended to amino alcohols; U.S. 2,384,816 and British Pat. 601,816. Attention is directed to Example V of both patents. There a method is described for preparing the tripotassium salt of nitrilotriacetic acid. The method of the example comprises heating—in the presence of water—one mole of triethanolamine with 4.0 moles of potassium hydroxide. (This amounts to a 1.0 mole excess of the hydroxide.) As reported in the example, the total gas volume after 16 hours was 38 liters.

Calculations indicate that the yield of desired salt was very low. Had the reaction gone to completion, six moles of hydrogen would have evolved. (This is depicted by the equation above.) At standard temperature and pressure, six moles of gas occupies 134.4 liters.

Examples II–IV of the above-cited patents also indicate that the patented process affords relatively low yields of other tertiary amino acid salts.

Attention is also directed to U.S. 2,384,217 and British Pat. 601,817. These patents are closely related to those cited above. More specifically, they are directed to use of metal catalysts—such as cadmium oxide—to promote the reaction process described in the aforementioned patents.

U.S. 2,384,817 (page 4, left-hand column lines 71–72) states that the process of that patent can be used to prepare tricarboxymethyl amine from triethanolamine. However, no specific example illustrating this reaction is given in the patent (or its British counterpart). Because the preparation of salts of the carboxylic acid corresponding to triethanolamine is a preferred embodiment of my invention, I reacted that amine with sodium hydroxide using cadmium oxide as a catalyst as taught by the patents cited, taking pains to isolate as much product as possible.

More specifically, to a stainless steel flask, fitted with a water separator and a condenser, was charged 18.55 g. (0.126 mole) of triethanolamine, 21.8 ml. of 50.1 percent sodium hydroxide solution (0.415 mole of NaOH) and 1.0 g. (0.00779 mole) of cadmium oxide. Evolved gas was measured with a wet test meter. The reaction mixture was heated with a silicone oil bath.

The temperature of the oil bath was raised to 150° C. and most of the water was collected. The temperature of the bath was raised to 220° C. and maintained at that temperature for 18 hours at which time gas evolution had essentially ceased. Total gas evolution was 11.55 liters (61.6 percent of theory based on triethanolamine).

The contents of the flask were cooled, 150 ml. of water added and the mixture refluxed for a day to dissolve the contents.

The solution was removed and another 150 ml. of water added. Refluxing was carried out for three more days. This dissolved the remaining contents of the flask.

Both solutions were combined, concentrated on a rotary evaporator, then filtered hot, cooled and diluted to 250 ml. in a volumetric flask.

A qualitative test indicated that a chelating agent was present. Two 10 ml. samples were removed and analyzed for chelating power. The average of the two values corresponded to a yield of 50.2 percent of the theoretical chelating power if all triethanolamine was converted to the compound, $N(CH_2COONa)_3$.

The remaining 230 ml. of solution was acidified to pH2 with cold sulfuric acid. The acidified solution was evaporated slowly until sodium sulfate just started to crystallize. A white solid, not sodium sulfate, was collected by filtration, water washed, and air dried. It weighed 3.04 grams and had a melting point of 245° d.

A sample was recrystallized from boiling water and had a melting point of 248° d. An infrared sample was identical in all significant details with an authentic sample of $N(CH_2COOH)_2$. Assuming all the 3.04 g. of product was NTA, then the yield was 8.8 percent.

As demonstrated, use of the prior art method gave a low yield of desired product. The experiment reported above also indicates that yields based on chelating effect are misleading as are yields based on amount of gas evolved.

In contrast to the above-cited prior art as shown by the examples below, the process of this invention affords substantially increased yields of acids and acid salts corresponding to amino alcohols.

SUMMARY OF THE INVENTION

The heart of this invention comprises the discovery of the promoter effects of aryl carbinols—in a process which comprises reacting an amino alcohol with an alkali metal hydroxide in the presence of water and a cadmium catalyst.

Thus, in a process which comprises preparation of an alkali metal salt of a tertiary amino carboxylic acid by reacting a tertiary amino alcohol with an alkali metal hydroxide—in the presence of water and a cadmium catalyst—this invention provides the improvement of conducting the process in the presence of a promoter quantity of an aryl carbinol. A preferred embodiment comprises use of an excess of sodium hydroxide in the process.

In general, the salts produced by this process are old compounds, and they have the many uses known for them. Thus, they are chemical intermediates, e.g. yielding the free acids upon acidification. In the main, the acids undergo all the reactions characteristic of carboxylic acids. In addition, the salts are useful in their own right as chelating agents. Nitrilotriacetic acid trisodium salt is becoming of increased importance as an ingredient in detergent formulations.

DESCRIPTION OF PREFERRED EMBODIMENTS

The alkali metal hydroxides employed in my process are preferably sodium and potassium hydroxide. Sodium hydroxide is most preferred because it is cheaper.

The tertiary amine alcohols employed in this process are characterized by a tertiary amino nitrogen atom, that is, an amine nitrogen bonded to three carbons. They are also characterized by the presence of at least one primary alcohol group; —$CH_2OH$. In other words, the process of this invention is not applicable to conversion of secondary and tertiary alcohol groups to acid radicals.

It is only necessary that the alkanol amine be stable, reactive, and unhindered. A reactant is stable if it and the product produced therefrom are stable—at least to some appreciable extent—under the reaction conditions employed. Likewise, an amine is reactive if it is free from chemical groups which cause extraneous side reactions to a deleterious degree and is free or chemical groups in such jaxtaposition with the reactive sites that they prevent those sites from undergoing the desired reaction because of a perturbation of their electronic configuration. A reactant is unhindered if it is free of groups so bulky that they prevent the reaction from taking place by steric hindrance. So long as these criteria are satisfied, an alkanol amine is applicable.

A preferred class of amino alkanols used are starting materials in this invention have the formula

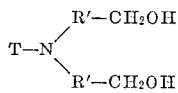

wherein R' is an alkylene radical, straight or branched chain, having up to about four carbons and T is a radical selected from (i)  

ii)  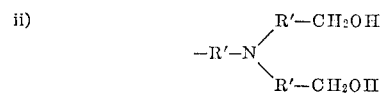

and (iii) 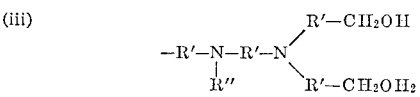

wherein R' has the same significance as above and R" is H or an alkyl radical of up to 4 carbons.

Because they are more readily available, highly preferred tertiary amino alcohols are those having —$CH_2CH_2OH$ groups bonded to the nitrogen. The simplest compound of this type is triethanolamine, $N(CH_2CH_2OH)_3$. Other amino alcohols within this preferred class are prepared by reacting ethylene or propylene diamine with ethylene oxide. They have the formula

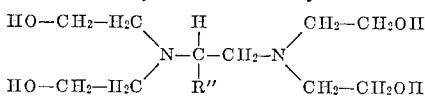

wherein R" is methyl or hydrogen.

Another preferred compound is prepared from diethylene triamine and ethylene oxide and has the formula

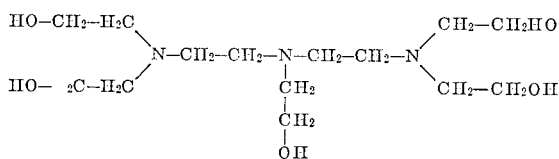

The analogous compound prepared from ethylene oxide and triethylene tetramine is also a preferred starting material. With regard to the preparation of the poly-amino compounds mentioned above, reference is made to page 6 of British Pat. 601,817.

Good results are achieved when at least a stoichiometric amount of alkali metal hydroxide is employed. Best yields are obtained when the hydroxide is used in excess. Hence, I prefer to use at least a 10 mole percent excess of alkali metal hydroxide. Thus, for example, when reacting one mole of triethanolamine (which has three reactable hydroxy groups) I prefer to use at least 3.3 moles of metal hydroxide. There appears to be no real upper limit on the amount of excess hydroxide and this is governed by economics, size of reaction vessel, ease of separation of desired product, and similar considerations. Generally good results are obtained when up to 0.5 mole excess is employed, but greater amounts of metal hydroxide can be used, if desired.

The cadmium catalyst can be a wide variety of cadmium containing materials such as cadmium metal, cadmium oxide, simple cadmium (II) salts as cadmium acetate, propionate, or butyrate as well as cadmium chloride and sulfate. The range of amounts of catalyst is one atom of cadmium for each 10 to 1000 primary hydroxyl groups in the aminoalkanol to be reacted. An optimum range in many instances is one atom of cadmium per each 20 to 200 primary alcohol groups (in the amino alkanol to be reacted).

The promoter alcohol is an aryl carbinol having the formula $R_3C$—OH wherein R is an aryl radical. I am unaware of any real upper limit on the number of carbons but prefer use of alcohols of 19–31 carbons, especially 19–25 carbon atoms, because these alcohols are more readily available. The amount of alcohol employed is from 0.05 to 10 moles per mole of catalyst. A preferred range is from 0.1 to 1.0 mole.

For the process of this invention, water is a necessary ingredient. As appreciated by a skilled practitioner, the amount of water present will be governed to some extent by the reaction temperature, which preferably, is within the range of from about 150° to about 260° C.; preferably 190–240° C. In general, it can be stated that the amount of water used is from about 3 to about 10 moles per mole of triethanolamine. However, it is not necessary to carefully add this amount of water to the reaction zone. In fact, a preferred method for getting water into the reaction zone is to add the metal hydroxide in the form of a concentrated solution, (say 50 percent by weight) and then heat the reaction mass in an open vessel until the desired reaction temperature is obtained.

The reaction pressure is not critical; ambient and super-atmospheric pressures up to say 1000 p.s.i.g. can be used. The reaction time is somewhat extended; good results being usually achieved in 8–70 hours.

The method of adding the reactants to the reaction zone is not critical. If desired, all reactants can be added to the vessel and the contents can then be heated to reaction temperature. It has also been found that the water, promoter and/or catalyst can be added incrementally and good results are achieved.

In the example following, nitrilotriacetic acid is abbreviated NTA.

EXAMPLE I

A 300 ml. silvered round-bottomed glass reaction flask was charged with 32.16 g. (0.215 mole) of triethanolamine, 34.0 (0.850 mole) of sodium hydroxide, 15.0 g. of triphenylmethanol, and 2.97 g. (0.0232 mole) of cadmium oxide. The reaction mixture was heated to 220° for 65 hours at which time gas evolution had reached 70.0 percent of theory. The reaction was terminated because the oil in the oil bath had polymerized. The contents of the reaction flask were dissolved with refluxing water, extracted twice with ether, filtered to remove catalyst, treated with 2 g. of Norit A, filtered again, concentrated to 300 ml. acidified to pH 2.4 with dilute sulfuric acid, and cooled with an ice bath. The tan crystals which weighed 42.1 g. (102.5 percent). The crystals were recrystallized from boiling water after treatment with Norit A and yielded 8.65 g. (21.1 percent) of white crystals of NTA, M.P. 237° d.

The ether extracts were washed with water, filtered, dried and evaporated to dryness. The weight of triphenylmethanol recovered in this manner was 15.00 g. (100 percent), having M.P. 162–3° (the original material had M.P. 163.5–164°).

Similar results are obtained if cadmium metal, cadmium acetate, cadmium propionate, cadmium butyrate, cadmium sulfate, or cadmium chloride is used as the catalyst in the above procedure.

Similar results are also obtained when tritolylmethanol, tri-[o-cresyl]methanol, tri-[m-cresyl]methanol, tri-[p-cresyl]methanol, tri-[ethylphenyl]methanol, tri[o-diethylphenyl]methanol trimesitylmethanol, tricumenylmethanol, tridurenylmethanol, and triisobutylphenylmethanol are used as the promoter.

Similar results are obtained when the reaction temperature is 150°, 220°, or 240° C.

Similar results are obtained when the amount of sodium hydroxide is from 3.3 to 4.15 moles per mole of triethanolamine.

EXAMPLES II–VI

Other amino alkanols can be reacted according to the process of this invention. To illustrate this, other preparations following the procedure of Example I are summarized below. In each instance below the catalyst added to the reaction mixture is cadmium oxide. In the first two preparations, the promoter is triphenylmethanol. In the remainder, the promoter is tri-n-butylphenyl methanol. The first preparation is conducted at 190° C.; the next at 210°, all others at 230–240° C. Ambient pressures are used.

In the first example below a 10 mole percent excess of sodium hydroxide is employed. In all others, a 50 mole percent excess is used. The amount of catalyst in all but the first preparation below is equivalent to one atom of cadmium per each 20 hydroxyl groups in the amino alkanol. In the first, the amount of catalyst is one atom of cadmium per each 200 hydroxyl groups in the amino alkanol. In the first example below, the amount of promoter is 1.0 mole per mole of alkanolamine. In all others the amount of promoter is 0.05 mole per mole of alkanol amine. In the first example below the amount of water is 3 moles per mole of alkanol amine, in all others 10 moles per mole of alkanol amine is employed.

| Example | Alkanolamine | Product |
|---|---|---|
| II | Monoethanolamine | Glycine. |
| III | Tetraethanol ethylene diamine. | Tetracarboxymethyl ethylene diamine. |
| IV | Tetraethanol propylene diamine. | Tetracarboxymethyl propylene diamine. |
| V | Pentaethanol diethylene triamine. | Pentacarboxymethyl diethylene triamine. |
| VI | Hexaethanol triethylene tetramine. | Hexacarboxymethyl triethylene tetramine. |

EXAMPLES VII–XI

Examples II–VI are repeated using potassium hydroxide instead of sodium hydroxide.

The above examples illustrate that carbinols having the formula

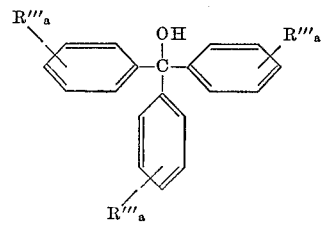

wherein R''' is a radical of 1–4 carbons and $a$ is equal to zero or 1, are promoters of this invention. Likewise, the above examples illustrate that mono- and polysubstituted aryl groups can be present in the promoter molecules. (Compounds wherein the three aryl radicals are not identical can be employed as promoters, but their use is not preferred since they are less readily available than the symmetrical compounds.)

Having fully described the process of this invention, it is desired that the scope of the protection granted be limited solely by the lawful scope of the appended claims.

I claim:

1. In a process for the preparation of an alkali metal salt of a tertiary amino carboxylic acid, which comprises reacting
   an alkali metal hydroxide selected from NaOH and KOH, with
   a tertiary amino alcohol having at least one primary alcohol groups,
said process being conducted in the presence of water and a cadmium catalyst; the improvement which comprises:
   conducting said process in the presence of from about 0.05 to about 1.0 mole—per each mole of amino alcohol—of an aryl carbinol having the formula $R_3$—C—OH, wherein R is an aryl group of from 6 to about 10 carbon atoms.

2. The process of claim 1 wherein said metal hydroxide is sodium hydroxide.

3. The process of claim 2 wherein said amino alcohol is triethanolamine.

4. The process of claim 3 wherein from 3.3 to 4.15 moles of sodium hydroxide are used per each mole of triethanolamine.

5. The process of claim 4 wherein said process is conducted at a temperature within the range of from about 150° to about 240° C.

6. The process of claim 5 wherein said promoter is triphenylmethanol.

References Cited

UNITED STATES PATENTS 2,384,817  9/1945  Chitwood _____ 260—531

LORRAINE A. WEINBERGER, Primary Examiner

D. E. STENZEL, Assistant Examiner